US00RE40665E

(19) United States
(12) Reissued Patent
Murosawa et al.

(10) Patent Number: US RE40,665 E
(45) Date of Reissued Patent: Mar. 17, 2009

(54) MULTILAYER CERAMIC CAPACITOR

(75) Inventors: Takako Murosawa, Tokyo (JP); Kazunori Noguchi, Tokyo (JP); Mari Miyauchi, Tokyo (JP); Akira Sato, Tokyo (JP)

(73) Assignee: TDK Corporation, Tokyo (JP)

(21) Appl. No.: 11/431,158

(22) Filed: May 10, 2006

Related U.S. Patent Documents

Reissue of:
(64) Patent No.: 6,987,662
Issued: Jan. 17, 2006
Appl. No.: 11/043,267
Filed: Jan. 27, 2005

(30) Foreign Application Priority Data

Jan. 30, 2004 (JP) ..... 2004-024231

(51) Int. Cl.
*H01G 4/20* (2006.01)
*H01G 4/06* (2006.01)

(52) U.S. Cl. ..... 361/312; 361/321.2
(58) Field of Classification Search ..... 361/311–313, 361/320, 321.1, 321.2, 321.3, 321.4, 321.5
See application file for complete search history.

(56) References Cited

U.S. PATENT DOCUMENTS

2004/0233612 A1 11/2004 Sugimoto et al.

FOREIGN PATENT DOCUMENTS

| | | | |
|---|---|---|---|
| EP | 1347476 | A2 | 9/2003 |
| JP | A 05-062855 | | 3/1993 |
| JP | 11-273986 | A | 10/1999 |
| JP | A 2000-277369 | | 10/2000 |
| JP | A 2001-307939 | | 11/2001 |
| JP | A 2003-077761 | | 3/2003 |
| JP | A 2003-100544 | | 4/2003 |
| JP | A 2003-124049 | | 4/2003 |
| JP | A 2003-133164 | | 5/2003 |

*Primary Examiner*—Eric Thomas
(74) *Attorney, Agent, or Firm*—Oliff & Berridge, PLC

(57) ABSTRACT

A multilayer ceramic capacitor 1 having internal electrode layers 3, internal dielectric layers 2 having the thickness of less than 2 μm, and external dielectric layers 20 wherein; the internal dielectric layers 2 and the external dielectric layers 20 include a plural number of dielectric particles 2a, 20a, and when y1 is ratio(D50a/D50b) of D50a and D50b where D50a is an average particle size of dielectric particles 2a included in the internal dielectric layers 2 and D50b is an average particle size of dielectric particles 20a included in the external dielectric layer 20 and located at least 5 μm away from an internal electrode layer 3a, arranged outermost part of all the internal electrode layers, to the stacked direction, and x is thickness of the internal dielectric layer 2, y1 and x satisfy the following equations, $y1 \leqq -0.75x+2.275$ and $y1 \geqq -0.75x+1.675$. According to the present invention, even when thickness of internal dielectric layers 2 were made thinner, a multilayer ceramic capacitor 1 wherein improvements in all kinds of electric characteristics, specially an improvement in TC bias characteristic while having sufficient dielectric constant can be expected.

4 Claims, 7 Drawing Sheets

MULTILAYER CERAMIC CAPACITOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a multilayer ceramic capacitor.

2. Description of the Related Art

In recent years, in order for multilayer ceramic capacitor to miniaturize, obtain larger capacitance, reduce cost and obtain higher reliability, internal dielectric layer which is arranged between 2 internal electrode layers facing each other, is making progress to become thinner. Concretely, thickness of an internal dielectric layer after firing is made thinner to around 1 μm. As the thickness of an internal dielectric layer is made thinner, volume ratio of internal electrode layers made up in capacitor device body (tip sintered body) become larger.

Conventionally, dielectric material for additives is added to internal electrode layer paste forming internal electrode layer in order to restrain breaking by firing, sintering of base metal conductive materials such as Ni, etc. (see Japanese Patent Publication (A) No. 5-62855, Japanese Patent Publication (A) No. 2000-277369, Japanese Patent Publication (A) No. 2001-307939, Japanese Patent Publication (A) No. 2003-77761 and Japanese Patent Publication (A) No. 2003-100544). Dielectric material for additives added to the internal electrode layer paste is diffused to the internal dielectric layer during firing the non-fired capacitor device body. Therefore, as dielectric material for additives added to the internal electrode layer paste increases, diffusing ratio to internal dielectric layer during firing becomes higher.

Namely, in recent years, as internal dielectric layers become thinner and number of stacked layer increases, volume ratio of internal electrode layer paste pattern made up in capacitor device body before firing become large. Compared to the case without making internal dielectric layer thinner, during firing, the ratio of dielectric material for additives diffused in internal dielectric layer is becoming higher.

Consequently, particle growth of dielectric particles composing internal dielectric Layer were urged and the microstructure of internal dielectric layer were affected. With this effect to the microstructure, all kinds of electric characteristics (tan δ, bias characteristic, temperature characteristic, reliability) of obtained multilayer ceramic capacitor may have been deteriorated.

Japanese Patent Publication (A) No. 2003-133164 discloses multilayer ceramic capacitor wherein the average particle size of dielectric particles near external electrodes is equal to or smaller to that of dielectric particles in the executive area. However, the object of the technical as in Japanese Patent Publication (A) No. 2003-133164 is to prevent crack at external electrode when sintering.

SUMMARY OF THE INVENTION

An object of the present invention is to provide a multilayer ceramic capacitor wherein improvements in all kinds of electric characteristics, especially an improvement in TC bias characteristic while having sufficient dielectric constant can be expected even when the capacitor is made thinner.

In order to achieve the above-mentioned object, according to first aspect of the invention, multilayer ceramic capacitor having internal electrode layers, internal dielectric layers(dielectric layers wherein each of the layers exists between a couple of internal electrode layer) having thickness of less than 2 μm, and external dielectric layers are provided wherein; the internal dielectric layers and the external dielectric layers include a plural number of dielectric particles, and when y1 is the ratio (D50a/D50b) of D50a and D50b where D50a is an average particle size of dielectric particles included in the internal dielectric layers and D50b is an average particle size of dielectric particles included in the external dielectric layer and located at least 5 μm away from an internal electrode layer, arranged outermost part of all the internal electrode layers, to the stacked direction, and x is thickness of the internal dielectric layer, y1 and x satisfy the following equations; $y1 \leqq -0.75x+2.275$ and $y1 \geqq -0.75x+1.675$.

According to the second aspect of the invention, multilayer ceramic capacitor having internal electrode layers, internal dielectric layers having thickness of less than 2 μm, and external dielectric layers are provided wherein, the internal dielectric layers include a plural number of dielectric particles, and when y2 is ratio of dielectric particles (coarse particles), having an average particle size of at least 2.25 times larger than D50a, existing in dielectric particles where D50a is an average particle size of the dielectric particles included in the internal dielectric layers, and x is thickness of the internal dielectric layer, y2 and x satisfy the following equations; $y2 \leqq -25x+37.5$ and $y2 \geqq -2.75x+4.125$.

According to the third aspect of the invention, case is provided wherein the first and the second aspects of the invention are put together.

Namely, multilayer ceramic capacitor having internal electrode layers, internal dielectric layers having thickness of less than 2 μm, and external dielectric layers are provided wherein, the internal dielectric layers and the external dielectric layers includes a plural number of dielectric particles, and when y1 is ratio (D50a/D50b) of D50a and D50b where D50a is an average particle size of dielectric particles included in the internal dielectric layers and D50b is an average particle size of dielectric particles included in the external dielectric layer and located at least 5 μm away from an internal electrode layer, arranged outermost part of all the internal electrode layers, to the stacked direction, y2 is ratio of dielectric particles (coarse particles), having an average particle size of at least 2.25 times larger than D50a, existing in the dielectric particles included in the internal dielectric layer, and x is thickness of the internal dielectric layer, y1 and x satisfy the following equations; $y1 \leqq -0.75x+2.275$ and $y1 \geqq -0.75x+1.675$ and y2 and x satisfy the following equations; $y2 \leqq -25x+37.5$ and $y2 \geqq -2.75x+4.125$.

According to the fourth aspect of the invention, multilayer ceramic capacitor having internal electrode layers, internal dielectric layers having thickness of less than 2 μm, and external dielectric layers are provided wherein, the internal dielectric layers and external dielectric layers include a plural number of dielectric particles, and when y3 is the ratio (D50a/D50c) of D50a and D50c where D50a in an average particle size of dielectric particles included in the internal dielectric layers and D50c is an average particle size of main component material used to form internal dielectric layers, and x is thickness of the internal dielectric layers, y3 and x satisfy the following equations; $y3 \leqq -0.95x+2.865$ and $y3 \geqq -0.95x+2.115$.

Multilayer ceramic capacitor according to the invention can be manufactured such as by following procedures. However, the manufacturing method of the multilayer ceramic capacitor of the invention is not limited to the following methods.

One of the above-mentioned methods is a manufacturing method of a multilayer ceramic capacitor comprising a step of firing multilayer body formed by using dielectric layer plate including dielectric material including main component material and subcomponent material, and internal electrode layer paste including dielectric material for additives wherein, the dielectric material for additives include at least maim component material for additives, the main component material for additives substantially has the same composition with main component material included in the dielectric material in dielectric layer paste, and the lattice constant is over 4.000 to less than 4.057.

The other method is a manufacturing method of a multilayer ceramic capacitor comprising a step of firing multilayer body formed by using dielectric layer paste including dielectric material, including main component material and subcomponent material, and internal electrode layer paste including dielectric material for additives, wherein the dielectric material for additives include at least main component material for additives, and the main component material for additives substantially has the same composition group with main component material included in the dielectric material in dielectric layer paste and has 25 to 250 emission amount of OH group.

Meaning of "substantially has the same composition group" as in above methods include not only when kinds of each element and composition molar ratio of said each element are entirely the same, but when kinds of each element are the same but composition molar ratio of said each element are somewhat different. As for the former cases for instance, when main component material included in dielectric material in dielectric layer paste is $(BaO)_m TiO_2$ (provided that $_m$=1), main component material for additives included in dielectric material for additives in internal electrode layer paste is $(BaO)_{m'} TiO_2$ (provided that $_{m'}$=1). As for the latter case, for instance, main component material is $(BaO)_m TiO_2$ (provided that $_m$=1), main component material for additives is $(BaO)_{m'} TiO_2$ (provided that $_{m'}$=0.990 to 1.050 or so).

Namely, by adjusting the lattice constant and the discharge amount of hydroxyl group of main component material for additives included in dielectric material for additives in internal electrode layer paste, existing state of dielectric particles composing dielectric layer after firing is controlled.

With this method, dielectric material for additives include "at least main component material for additives", and may further include subcomponent material for additives.

With this method, at least main component material for additives included in dielectric material for additives and main component material included in dielectric material in dielectric layer paste substantially may be the same composition group. Therefore, when dielectric material for additives include subcomponent material for additives other than main component material for additives, (1) only main component material for additives, a portion of dielectric material for additives, and main component material included in the dielectric material in dielectric layer paste have substantially the same composition group. In other words, the composition of subcomponent material for additives, the remainder of dielectric material for additives, and the composition of the subcomponent material included in dielectric material in dielectric layer paste may be different. (2) All of the dielectric material for additives (as a matter of course, main component material for additives is included) may have substantially the same composition group with all of dielectric material in dielectric layer paste.

In the invention, the dielectric layer merely expressed as "dielectric layer" signifies internal dielectric layer and/or external dielectric layer.

In the specification, units of the average particle sizes D50a, D50b and D50c and the thickness x are considered to be all "μm". The unit of existing ratio y2 is considered to be "%".

The inventors have found that, by restraining the particle growth of dielectric particles when firing and controlling microstructure inside the capacitor, all kinds of electric characteristics of obtained multilayer ceramic capacitor can be improved, specially, TC bias characteristic can be improved even with sufficient dielectric constant.

Concretely, it was found that when the thickness x of internal dielectric layer is made thinner to less than 2 μm, by controlling inner composition of capacitor to satisfy at least one of the following equations (1), (2) and (3), all kinds of electric characteristics can be improved.

$$y1 \leqq -0.75x+2.275 \text{ and } y1 \geqq -0.75x+1.675 \quad (1)$$

$$y2 \leqq -25x+37.5 \text{ and } y2 \geqq -2.75x+4.125 \quad (2)$$

$$y3 \leqq -0.95x+2.865 \text{ and } y3 \geqq -0.95x+2.115 \quad (3)$$

Moreover, it was found that when the internal dielectric layer is made even thinner (made thinner such as from 1.3 μm to 1.1 μm or so), by satisfying at least one of the above (1), (2) and (3), improvement in temperature characteristic other than in said TC bias characteristic can be attempted. Among the preferred range, TC bias characteristic increases as the values in (1) and (2) approach the minimum value. More preferably, (1) and (2) are satisfied simultaneously. The most preferably, when the value of (1) is fixed, TC bias characteristic improves as the value of (2) decreases, in other words, as the coarse particles become few.

In other words, according to the invention, by making the internal dielectric layer thinner, all kinds of electric characteristics of obtained multilayer ceramic capacitor can be improved, specially, TC bias characteristic can be improved even with sufficient dielectric constant.

BRIEF DESCRIPTION OF THE DRAWINGS

These and other objects and features of the present invention will be explained in further detail with reference to the attached drawings, wherein.

DESCRIPTION OF THE PREFERRED EMBODIMENTS

Below, the present invention will be explained based on the embodiments shown in the figures.

In the present embodiment, a multilayer ceramic capacitor having internal electrode layers, internal dielectric layers and external dielectric layers is exemplified to explain, wherein a plural number of the internal electrode layers and the internal dielectric layers are stacked alternately and external dielectric layers are arranged both end faces thereof to the stacked directions.

Multilayer Ceramic Capacitor

Figure 1:
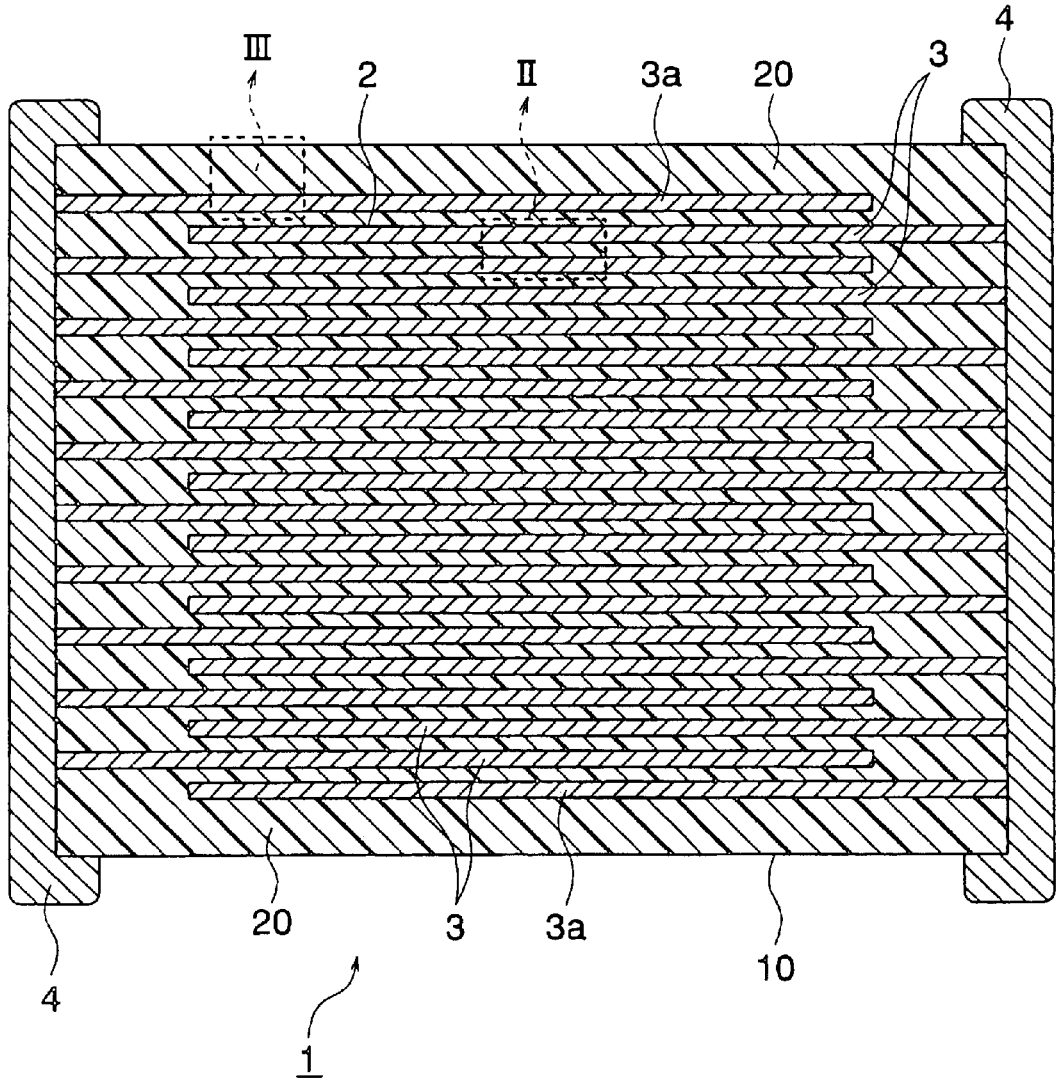
FIG. 1 is a schematic sectional view of a multilayer ceramic capacitor according to an embodiment of the present invention.

As shown in FIG. 1, a multilayer ceramic capacitor 1 according to an embodiment of the present invention has a capacitor device body 10 of a configuration of internal dielectric layers 2 and internal electrode layers 3 stacked alternately. At the two ends of the capacitor device body 10 are formed a pair of external electrodes 4 conductive with each of the internal electrode layers 3 alternately arranged inside the device body 10. The internal electrode layers 3 are stacked so that end faces thereof alternately protrude out to the surfaces of the two opposing ends of the capacitor device body 10. The pair of external electrodes 4 are formed at the two ends of the capacitor device body 10 and are connected to the exposed end faces or the alternately arranged internal electrode layers 3 to form a capacitor circuit.

The shape of the capacitor device body 10 is not particularly limited, but normally is made a rectangular parallelepiped. Further, the dimensions are also not particularly limited and may be made suitable dimensions in accordance with the application. Usually, however, they are (0.4 to 5.6 mm)×(0.2 to 0.5 mm)×(0.2 to 1.9 mm) or so.

In the capacitor device body 10, external electrode layers 20 are arranged at both outer ends of the laminating internal electrode layers 3 and internal dielectric layers 2 and providing protection to inside of the capacitor device body 10. "3a" as in the figures are an internal electrode layer arranged outermost part of all the stacked internal electrode layers.

Internal Dielectric Layer and External Dielectric Layer

The compositions of internal dielectric layers 2 and the outer dielectric layers 20 are not particularly limited in the invention and it may be composed of the following dielectric ceramic composition.

The dielectric ceramic composition according to the present embodiment may include barium titanate as a main component.

Sub components, included with the main component in the dielectric ceramic composition include one or more from Mn, Cr, Si, Ca, Ba, Mg, V, W, Ta, Nb, R(R is Y, at least one kind of rare-earth element), Si oxide and compound becoming oxide by firing. Addition of the sub component allows to have capacitor characteristic even firing under reduced atmosphere. As impurities, at least around 0.1 weight % of trace components such as C, F, Li, Na, K, P, S, Cl may be included. However, the compositions of the internal dielectric layers 2 nor the external dielectric layers 20 are not limited to the above composition.

In the present embodiment, it is preferable to use following compositions as the internal dielectric layers 2 nor the external dielectric layers 20. As a main component, barium titanate is included and as sub component, magnesium oxide and yttrium oxide is included. Further, as the other sub component, at least one from barium oxide and calcium oxide and at least one from silicon oxide, manganese oxide, vanadium oxide and molybdenum oxide are included. And, when barium titanate is converted to $BaTiO_3$, magnesium oxide to MgO, yttrium oxide to $Y_2O_3$,barium oxide to BaO, calcium oxide to CaO, silicon oxide to $SiO_2$, manganese oxide to MnO, vanadium oxide to $Y_2O_3$, and molybdenum oxide to $MoO_3$, with respect to 100 mole of $BaTiO_3$, MgO is 0.1 to 3 mole, $Y_2O_3$ is more than 0 mole to at most 5 mole, BaO+CaO is 0.5 to 12 mole, $SiO^2$ is 0.5 to 12 mole, MnO is more than 0 mole to at most 0.5 mole, $V_2O_5$ is 0 to 0.3 mole, $MoO_3$ is 0 to 0.3 mole and $V_2O_5$+$MoO_3$ is more than 0 mole.

The number of laminated layers, thickness, and other conditions of the internal dielectric layers 2 may be suitably determined in accordance with the object or application. In the present embodiment, the thickness x of internal dielectric layers 2 is made thinner to preferably less than 2 μm, more preferably, at most 1.5 μm. The thickness of the external dielectric layer 20 is around 50 μm to several hundred micrometers or so.

Figure 2:
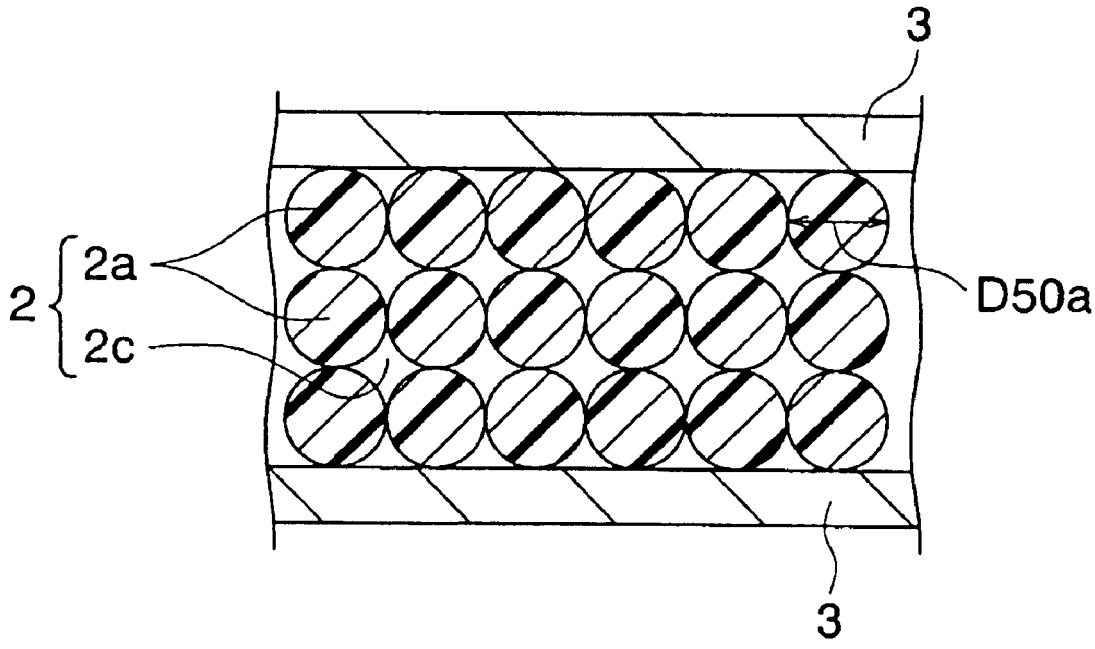
FIG. 2 is an enlarged sectional view of main portion of internal dielectric layer 2 as shown in FIG. 1.
Figure 3:
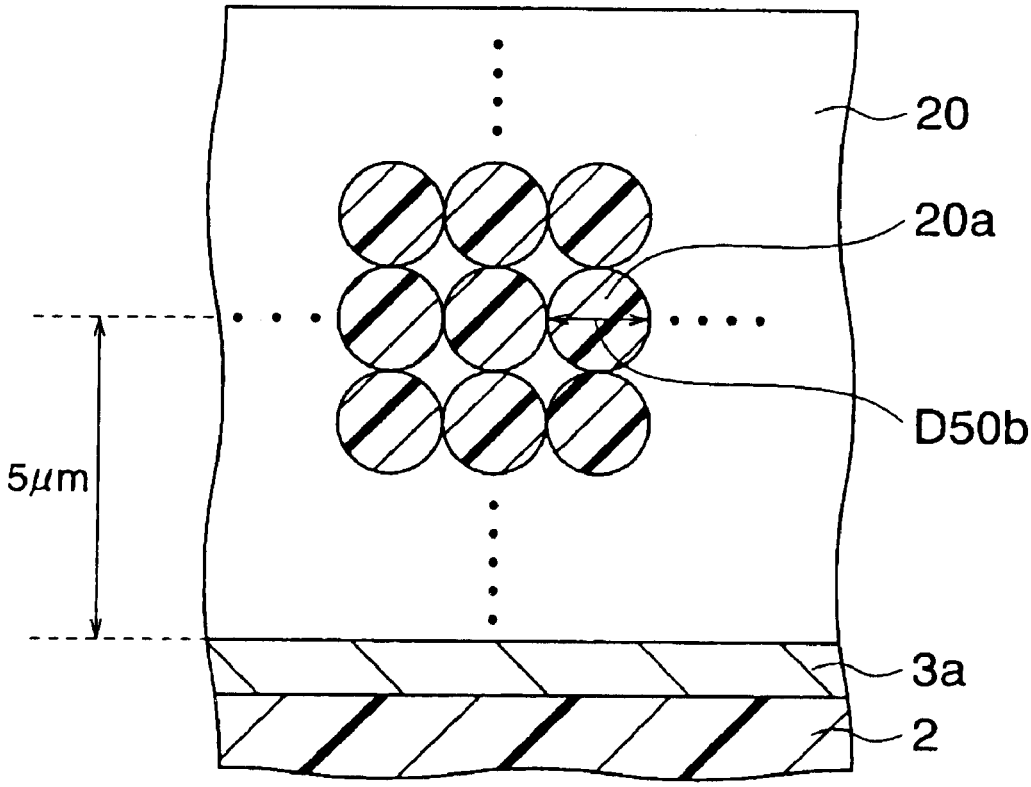
FIG. 3 is an enlarged sectional view or main portion of external dielectric layer 20 as shown in FIG. 1.

As shown in FIG. 2, internal dielectric layers 2 include dielectric particles 2a and particle phase 2c. As shown in the FIG. 3, external electrode layers 20 include dielectric particles 20a and the particle phase 20c.

Here, an average particle size of the dielectric particles 2a included in the internal dielectric layers 20 is D50a, an average particle size of dielectric particles 20a located at least 5 μm away from an internal electrode layers, arranged outermost part of all the internal electrode layers, to the stacked direction is 50b, and an average particle sizes of main component material used to form internal dielectric layer 2 is D50c. And the ratio of D50a and D50b (D50a/D50b) is y1 and the ratio of D50a and D50c (D50a/D50c) is y3 and ratio of the dielectric particles (coarse-grained particles) having 2.25 times larger average particle size than said D50a included in the internal dielectric layers 2 is y2. And the thickness of the internal dielectric layers 2 is X.

Here, in the first aspect, y1 and x satisfy the following equations; $y1 \leqq -0.75x+2.275$ and $y1 \geqq -0.75x+1.675$. For instance, when the thickness x of the internal dielectric layer 2 is 1.3 μm, y1 is 0.7 to 1.3, preferably, 0.7 to 1.2. And when x is 1.1 μm, y1 is 0.85 to 1.45, preferably, 0.85 to 1.3.

In the second aspect, y2 and x satisfy the following equations; $y2 \leqq -25x+37.5$ and $y2 \geqq -2.75x+4.125$. For instance, when the thickness x of the internal dielectric layer 2 is 1.3 μm, y2 is 0.55 to 5, preferably, 0.55 to 3.5. And when x is 1.1 μm, y2 is 1.1 to 10, preferably, 1.1 to 8.5.

In the third aspect, it is the case wherein the above first and the second aspects are combined.

In the fourth aspect, y3 and x satisfy the following equations; $y3 \leqq -0.95x+2.865$ and $y3 \geqq -0.95x+2.115$. For instance, when the thickness x of the internal dielectric layer 2 is 1.3 μm, y3 is 0.88 to 1.63, preferably, 0.88 to 1.5. And when x is 1.1 μm, y3 is 1.07 to 1.82, preferably, 1.07 to 1.70.

In case of $y1>-0.75x+2.275$ or $y1<-0.75x+1.675$, $y2>-25x+37.5$ or $y2<-2.75x+4.125$, and $y3>-0.95x+2.865$ or $y3<-0.95x+2.115$, particle growth of the dielectric particles 2a and 20a after firing cannot be protected. As a result, the present inventors have found that an improvement in all kinds of electric characteristics, especially in TC bias characteristic cannot be seen.

D50a is preferably 0.05 to 0.5 μm, more preferably 0.05 to 0.4 μm. When D50a is too large, it will be difficult to make the layer thinner and that decline in electric characteristics such as TC bias can be observed, on the other, when D50a is too small, dielectric ratio decreases.

D50b is preferably the same with the above D50a.

D50a and D50b are defined as following. Capacitor device body 10 are cut in the stacked direction of dielectric layers 2, 20 and the internal electrode layers 3, and the average surface area of 200 or more dielectric particles 2a at the cut face shown in FIG. 2 are measured, then, considering the surface areas as circles, diameter was calculated. "D50a" is the value which was two and half times larger than the said diameter.

The average surface area of 200 or more dielectric particles 20a at the cut face shown in FIG. 2 are measured, then, considering the surface areas as circles, diameter was calculated. "D50b" is the value which was two and half times larger than the said diameter D50a is an average particle diameter of dielectric particles 2a in internal dielectric layers 2 (portions contribute to capacitance) inserted between the internal electrodes 3.

D50b is an average particle diameter of dielectric particles 20a in external dielectric layers 20 (portions do not contribute to capacitance) not inserted between the internal electrode layers 3.

Particle phase 2c is normally composed of oxides of materials composing dielectric material or internal electrode materials, oxides of specially added materials or oxides of materials mixed as impurities during the process.

Internal Electrode Layers

Internal electrode layers 3 as shown in FIG. 1, is composed of base metal conductive materials that substantially act as electrodes. As the base metal used as conductive material, Ni or an Ni alloy is preferable. As the Ni alloy, an alloy of at least one element selected from Mn, Cr, Co, Al, Ru, Rh, Ta, Re, Os, Ir, Pt and W, and Ni is preferable. The content of Ni in the alloy is preferably at least 95 wt %. Note that the Ni or Ni alloy may also include various trace components such as P, C, Nb, Fe, Cl, B, Li, Na, K, F, S in amounts of not more than 0.1 wt % or so.

In the present invention, the thickness of the internal electrode layers 3 are made thinner, preferably less than 2 μm, more preferably 1.5 μm or less.

External Electrodes

As external electrodes 4 as shown in FIG. 1, normally at least one element from Ni, Pd, Ag, Au, Cu, Pt, Rh, Ru, Ir, or their alloys may be used. Normally, Cu, and Cu alloy, Ni, an Ni alloy, Ag, an Ag—Pd alloy, an In—Ga alloy are used. The thickness of the external electrodes may be suitably determined in accordance with application etc., but normally is preferably 10 to 200 μm or so.

Methods to Produce Multilayer Ceramic Capacitor

Next, an example of multilayer ceramic capacitor 1 of the present embodiment is exemplified.

(1) First, dielectric layer paste that composes internal dielectric layers 2 and external dielectric layers 20 as shown in FIG. 1 after firing and internal electrode layer paste composing internal electrode layers 3 as shown in FIG. 1 after firing are prepared.

Dielectric Layer Paste

Dielectric layer paste is prepared by mixing dielectric material and organic vehicle.

As dielectric material is suitably selected from various compounds to be compound oxides or oxides by firing, such as carbonates, nitrates, hydroxides, organometallic compounds. The dielectric material is normally used in powder form wherein the average particle size D50c is at most 0.5 μm, preferably around 0.05 to 0.4 μm. Here, "D50c" is a value calculated by converting the particles of material observed by SEM to a circle.

The organic vehicle includes a binder and a solvent. The binder may be normal binders such as ethyl cellulose, polyvinyl butyral and acrylic resins. Also, the solvent used is not particularly limited and may be organic solvents such as terpineol, butyl carbitol, acetone, toluene, xylene and ethanol.

Dielectric layer paste can be formed by mixing dielectric material and vehicle wherein water-soluble binder is solved in water. The water-soluble binder it not particularly limited but organic solvents such as polyvinyl alcohol, methyl cellulose, hydroxilic ethyl cellurose, water-soluble acrylic resin, emulsion etc.

The content of each component in dielectric layer paste is not particularly limited and, for instance, the dielectric layer paste can be prepared by including around 1 to 50 wt % of the solvent.

Additives suitably selected from all kinds of dispersant, plasticizers dielectric, sub component compounds, glass frit, insulators etc. may be included in the dielectric layer paste. In case of adding the additives, total content in the dielectric layer paste is preferably about 10 wt % or less.

Internal Electrode Layer Paste

In the present invention, the internal electrode layer paste is prepared by mixing conductive materials, dielectric material for an additive and organic vehicle.

As the conductive materials, Ni, Ni alloys and their mixtures are used. The form of these conductive materials are not particularly limited and these may be spherical, flakes, etc. and mixture thereof. As the particle diameter of conductive material, normally, when spherical, particles having an average particle diameter of less than 0.4 μm, preferably 0.01 to 0.2 μm or so is used. This is to realize highly advanced thinner layers. The conductive material is included in the internal electrode layer paste preferably by 35 to 60 wt %.

Dielectric material for additives are effective in containing internal electrode (the conductive material) to sinter in firing process.

In the present embodiment, dielectric materials for additives include main component material for an additive and subcomponent material for an additive. In the present embodiment, at least main component material for an additive included in dielectric materials for additives and main component material included in dielectric material in above dielectric layer paste substantially have the same composition system. Therefore, only main component material for an additive, which is a component of the dielectric material for an additive, and the main material included in above dielectric layer paste may substantially have the same composition. And all of the dielectric material for additives and all of the dielectric material in dielectric layer paste may substantially have the same composition. In this way, at least making the compositions of main component material for additives and the main component the same, the composition in the dielectric layer 2, 20 does not change by diffusion from internal electrode layers 3 to dielectric layers 2, 20.

In the present embodiment, main component material for additive in dielectric material for additive having specific lattice constant is preferably used. By utilizing the main component material having specific lattice constant for additive, improvement in all kinds of electric characteristics of the final obtained capacitor 1 can be attempted. Lattice constant of main component material for additive in preferably over 4.000 and less than 4.057, more preferably 4.004 to 4.0475. There is a tendency that when the lattice constant is excessively small or excessively large, the improvement in all kinds of electric characteristics cannot be obtained.

In the present embodiment, it is preferable to use main component material for additives in dielectric material for additive having specific discharge amount of hydroxyl group. By utilizing the main component material having specific discharge amount of hydroxyl group, improvements in all kinds of the electric characteristics of final obtained capacitor 1 is attained. The discharge amount of hydroxyl group in main component material for additives is preferably 25 to 250, more preferably 25 to 150; There is a tendency that when the discharge amount of hydroxyl group is excessively small or excessively large, the improvement in all kinds of electric characteristics cannot be obtained.

An average particle size of main component material for additives can be the same with the particle diameter of main component material included in dielectric material in dielectric layer paste. Although, it is preferable to be more small and it is preferably 0.01 to 0.2 μm, more preferably 0.01 to 0.15 μm. The value of average particle size is known to have interrelation with specific surface (SSA).

Dielectric material for an additive (It may only be main component material for additives or it may include both main component material for additives and subcomponent material for additives. The following is the same unless specially mentioned.) is not particularly limited but it is preferably produced through oxalate method, hydrothermal synthesis method, sol-gel method, hydrolysis method, alkoxide method etc. By utilizing the methods, the above mentioned dielectric material having the lattice constant and the discharge amount of hydroxyl group can effectively produced.

In comparison to the conductive material, dielectric material for additives is included in the internal electrode layer paste preferably 10 to 30 wt %, more preferably 15 to 20 wt %. When the content of the dielectric material for additives is excessively small, the containing effect of sintering the conductive material lowers, and when excessively large, continuity of internal electrode lowers. Namely, when then dielectric material for additives is excessively small or large inconveniences may occur such that either of the case cannot maintain sufficient capacitance as a capacitor.

Organic vehicle contains binder and solvent.

Binder is such as ethyl cellulose, acrylic resins, polyvinyl butyral, polyvinyl acetal, polyvinyl alcohol, polyolefin, polyurethane, polystyrene or copolymer thereof are exemplified. Binder is included in the internal electrode layer paste, in comparison to mixed powders of conductive material and dielectric material for additives, is preferably 1 to 5 wt %. When the amount or binder is excessively small, the strength tends to decrease and when large, loading density of metals in the electrode pattern before firing tends to decrease and this may cause difficulty to maintain the smoothness in internal electrode layer 3 after firing.

As solvent, substances known in the art such as terpineol, dihydro terpineol, butyl carbitol, kerosene, etc. can all be used. The content of the solvent is, in comparison to the entire paste, preferably around 20 to 50 wt %.

Plasticizer may be included in the internal electrode paste. The solvent is exemplified by phthalate ester such as butyl benzyl phthalate(BBP), adipic acid, phosphorous acid, easter, glycol group etc.

(2)Next, by utilizing the dielectric layer paste and the internal electrode layer paste, green tip is prepared. When using the printing method, dielectric layer paste and internal electrode layer paste of prescribed pattern are printed and stacked on the carrier sheet; then, cut into prescribed form and exfoliated from the carrier sheet to prepare the green tip. When using the sheet method, green sheet obtained by forming dielectric layer paste on the carrier sheet by prescribed thickness is formed, and internal electrode layer paste is printed on the green sheet by prescribed form, then the sheet is stacked to be green tip.

Figure 4:
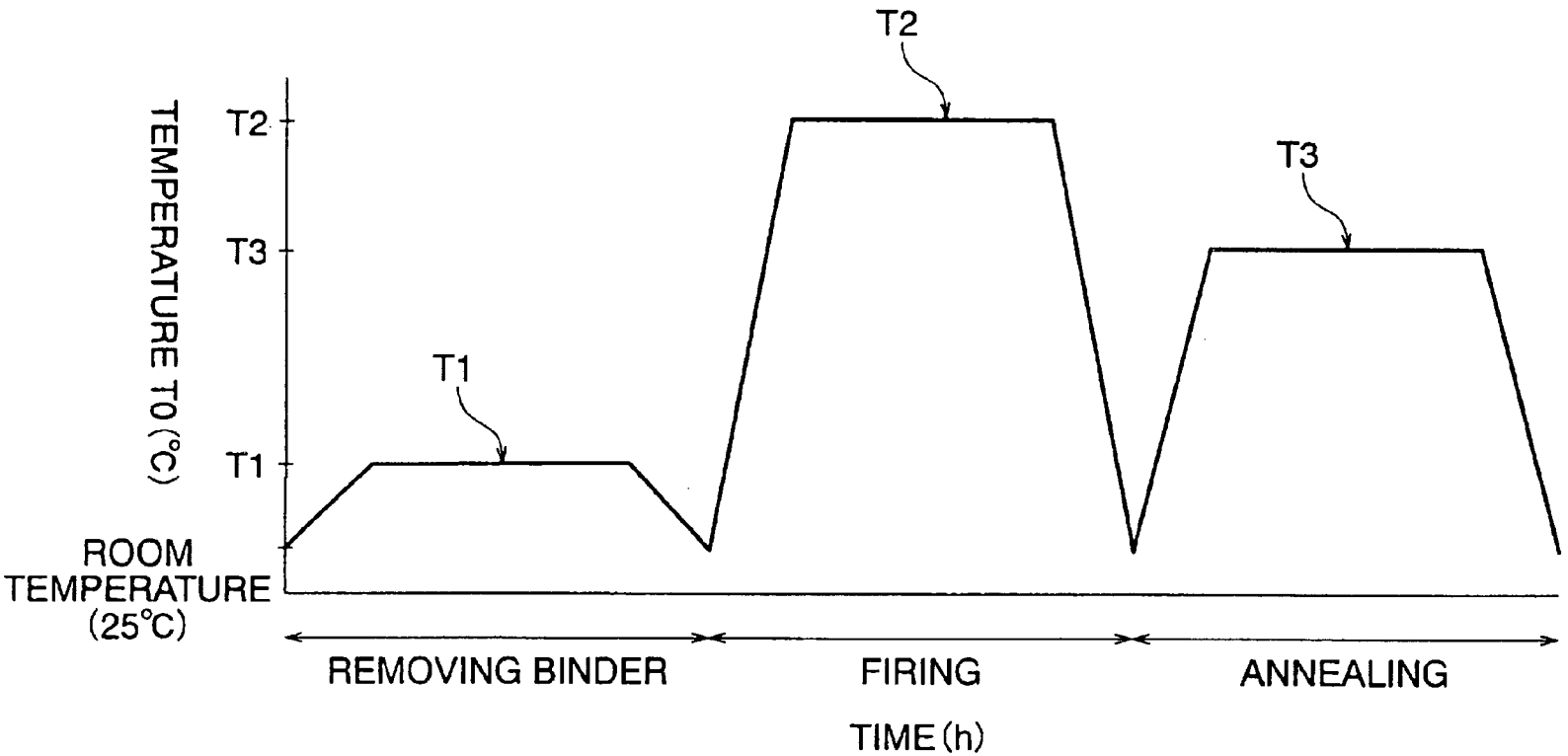
FIG. 4 is a graph indicating each temperature change at removing binder treatment, firing, and annealing.

(3) Next, the binder is removed from the obtained green tip. Process of removing the binder is, for instance, as shown in FIG. 4, raising atmospheric temperatures T0 with prescribed rate of rise from room temperature (25° C.) to the holding temperature T1 which removes binder, holding the temperature T1 for prescribed time, then, reducing the temperature with prescribed rate of decline.

In the present embodiment, the rate of rise is preferably 5 to 300° C./hour, more preferably 10 to 100° C./hour. Holding temperature T1 when removing the binder is preferably 200 to 400° C., more preferably 220 to 380° C. The holding time of T1 is preferably 0.5 to 24 hours, more preferably 2 to 20 hours. The rate of decline is preferably 5 to 300° C./hour, more preferably 10 to 100° C./hour. Process atmosphere when removing binder is preferably air or reduced atmosphere. Atmospheric gas when it reduced atmosphere is preferably moistened mixed gas of $N_2$ and $H_2$. Oxygen partial pressure under the reduced atmosphere, it is preferably $10^{-45}$ to $10^5$ Pa. When the oxygen partial pressure is excessively low, the effect of removing binder decreases and when excessively high, internal electrode layers tend to oxidize.

(4) Next, green tip is fired. Process of firing the green tip is, for instance, as shown in FIG. 4, raising atmospheric temperature T0 with prescribed rate of rise from room temperature (25° C.) to the holding temperature for firing T2, holding the temperature T2 for prescribed time, then, reducing the temperature with prescribed rate of decline.

In the present embodiment, the rate of rise is preferably 50 to 500° C./hour, more preferably 100 to 300° C./hour. Holding temperature for firing T2 is preferably 1100 to 1350° C., more preferably 1100 to 1300° C. and the most preferably 1150 to 1250° C. The holding time T2 is preferably 0.5 to 8 hours, more preferably 1 to 3 hours. When T2 is excessively low, even when the holding time of T2 is made longer, densification becomes insufficient, and when excessively high, breakage of the electrode by abnormal sintering in internal electrode layer, deterioration of the capacity-temperature characteristics due to dispersion of the conductive materials forming the internal electrode layers; and reduction of the dielectric ceramic composition composing dielectric layer may tend to occur.

The rate of decline is preferably 50 to 500° C./hour, more preferably 200 to 300° C./hour. Process atmosphere when firing is preferably reduced atmosphere. Atmospheric gas when at reduced atmosphere is preferably moistened mixed gas of $N_2$ and $H_2$.

The oxygen partial pressure under the firing atmosphere is preferably $6\times10^{-9}$ to $10^{-4}$ Pa. When the oxygen partial pressure is excessively low, breakage of the electrode by abnormal sintering of conductive material in internal electrode layer may occur, and when excessively high, internal electrode layers tends to oxidize.

(5) Next, when the green tip is fired under the reduced atmosphere, it is preferably followed by heat treatment (annealing). The annealing is a treatment reoxidizing dielectric layer and that characteristics of the final capacitor is obtained.

Annealing process is, for instance, as shown in FIG. 4, raising atmospheric temperature T0 with prescribed rate of rime from room temperature (25° C.) to the holding temperature T3 of annealing, holding the temperature T3 for prescribed time, then, reducing the atmospheric temperature T0 with prescribed rate of decline.

In the present embodiment, the rate of rise is preferably 100 to 300° C./hour, more preferably 150 to 250° C./hour. Holding temperature T3 of annealing is preferably 800 to 1100° C., more preferably 900 to 1100° C. The holding time of T3 is preferably 0 to 20 hours, more preferably 2 to 10 hours. When T3 is excessively low, oxidation of the dielectric layers 2 become insufficient, so the IR tends to become low or the IR lifetime tends to become shorter when T3 is excessively high, not only are the internal electrode layers 3 oxidized and does the capacity fall, but also the internal electrode layers 3 end up reacting with the dielectric base material and deterioration of the capacity-temperature characteristic, a drop in the IR, and a drop in the IR lifetime tend to occur.

The rate of decline 18 preferably 50 to 500° C./hour, more preferably 100 to 300° C./hour. Process atmosphere when annealing is preferably neutral atmosphere. Atmospheric gas when at neutral atmosphere is preferably moistened gas of $N_2$. During the annealing, raising the temperature to the holding temperature T3 under $N_2$ gas atmosphere, the atmosphere can be changed and the atmosphere through the annealing process can all be moistened gas of $N_2$. Oxygen partial pressure under the annealing atmosphere is preferably $2\times10^{-4}$ to 1 Pa. When the oxygen partial pressure is excessively low, reoxidizing dielectric layer 2 becomes difficult and when high, the internal electrode layers 3 tend to oxidize.

In the present embodiment, the annealing may be consist of the raising temperature process and the declining temperature process. Namely, temperature holding time may be zero. In such case, the holding temperature T3 is equivalent to the highest temperature.

In the above treatment for removing the binder, firing, and annealing, it is sufficient to use a wetter or so to moisten the $N_2$ gas or mixed gas etc. In this case, the water temperature is preferably 0 to 75° C.

The treatment for removing the binder, firing, and annealing may be performed consecutively or may be performed partially.

The above each treatment form the capacitor device body 10 composed of sintered body.

(6) Next, external electrodes 4 are formed onto the obtained capacitor device body 10. The formation of the external electrodes 4 can be performed by following processes that are known in the art. The end faces of the obtained capacitor device body 10 composed of the mentioned sintered body is polished such as by barrel polishing or sand blasting, then, external electrode paste, usually including at least one element selected from Ni, Pd, Ag, Au, Cu, Pt, Rh, Ru, Ir etc. or their alloys, are baked or In—Ga alloys are applied onto both end faces. If necessary, the surfaces of the external electrodes 4 are plated to form covering layers.

Above, an embodiment of the present invention was explained, but the present invention is not limited to this embodiment in any way. The invention may of course be worked in various ways within the scope of the gist of the invention.

For example, in the above embodiment, treatment of removing binder, firing and annealing are performed separately. However, in the invention, at least 2 treatments can be done continuously. When the treatments are performed continuously, it is preferable that after removing binder treatment, atmosphere is changed without cooling, then, raising the temperature to the holding temperature T2 for firing and the firing is performed, followed by cooling to the holding temperature T3 of annealing and the annealing is performed.

EXAMPLES

Next, examples in further detail of the invention will be given to explain the present invention however the invention is not limited to these examples.

Example 1

Preparing Dielectric Layer Paste

First, as dielectric material, PVB(polyvinyl butyral) resin as binder, DOP(dioctyl phthalate) as plasticizer, and ethanol as solvent were prepared. Dielectric material was produced by preparing a plural kind of $BaTiO_3$ having average particle size D50c of 0.2 μm as main component, and for each $BaTiO_3$, 0.2 mole % of $MnCO_3$, 0.5 mole % of MgO, 0.3 mole % of $V_2O_5$, 2 mole % of $Y_{23}$, 3 mole % of $CaCO_3$, 3 mole % of $BaCO_3$, 3 mole % of $SiO_2$ as subcomponent were prepared and wet mixed for 16 hours in the ball mill and dried.

Next, compared with the dielectric material, 10 wt % of binder, 5 wt % of plasticizer, 150 wt % of solvent were weighed, mixed by ball mill, and slurrying was performed to obtain dielectric layer paste.

Preparing Internal Electrode Layer Paste

Ni particles having average particle size of 0.4 μm as conductive material, dielectric material for additives, ethyl cellulose resin as binder, and terpineol as solvent were prepared.

Dielectric material for additives including $BaTiO_3$ as main component material for additives which substantially has the same composition with dielectric material in said dielectric layer paste and subcomponent material for additives including $MnCO_3$, MgO, $V_2O_5$, $Y_2CO_3$, $CaCO_3$, $BaCO_3$ and $SiO_2$. $BaTiO_2$ as main component material for additives, for each sample, as mentioned in table 1, lattice constant and discharge amount of hydroxyl group were varied.

The lattice constant of the main component material for additives in table 1 were calculated by the peak position obtained by XRD(rent 2000 made by Rigaku Corp.) at 300 mA, 50 Kv, 10 to 85 degrees which was considered as the lattice constant of tetragonal crystal.

The discharge amount of hydroxyl group in main component material for additives as in table 1 were calculated from peak intensity at 3510 $cm^{-1}$ caused by hydroxyl group expansion-oscillation by utilizing FT-IR (Fourier transform infrared spectroscopy) diffused reflection method.

Next, compared with the conductive material, 20 wt % of dielectric material for additives were added. Compared with the mixed powder of conductive material and dielectric material for additives, 5 wt % of binder, 35 wt % of solvent were weighed and added, mixed by ball mill, and slurrying was performed to obtain internal electrode layer paste.

Preparing Multilayer Ceramic Tip Capacitor Samples

Multilayer Ceramic Tip Capacitor 1 as shown in FIG. 1 was prepared by utilizing the obtained dielectric layer paste and the internal electrode layer paste as following.

Dielectric layer paste was applied onto the PET film by doctor blade method by prescribed thickness and then by drying them, 2 μm thickness of ceramic green sheet was formed. In the present embodiment, the mentioned ceramic green sheets were considered to be the first green sheet and a plural number of the sheets were prepared.

On the obtained first green sheet, internal electrode past was formed by screen printing method with the prescribed pattern, then, ceramic green sheet having 1 μm thickness of electrode pattern was obtained. In the present embodiment, the mentioned ceramic green sheets were considered to be the second green sheet and a plural number of the sheets were prepared.

Green sheet group was formed by laminating the first green sheets to the thickness of 300 μm. Then, 11 sheets of the second green sheets were stacked on the green sheet group. And further, on the second green sheets, the green sheet group was formed by laminating the first green sheets in the same way as mentioned above. Then, by heated at 80° C. and pressurized by 1 ton/cm$^2$, green multilayer body was obtained.

Next, the obtained multilayer body was cut to the size of 3.2 mm long×1.6 mm wide×1.0 mm height, removing binder treatment, firing and annealing under the below mentioned condition and then, the sintered body is obtained. Graph showing each temperature change at removing binder treatment, firing and annealing is shown in FIG. 4.

Removing binder was performed under the conditions of rising temperature rate of 30° C./hour, holding temperature T1 of 250° C., holding time of 8 hours, falling temperature rate of 200° C./hour and treatment atmosphere of air atmosphere.

Firing was performed under the conditions of rising temperature rate of 200° C./hour, holding temperature T2 of 1240° C., holding time of 2 hours, falling temperature rate of 200° C./hour and treatment atmosphere of reduced atmosphere(prepared by passing mixed gas of $N_2$ and $H_2$ through water vapor under oxygen partial pressure of $10^{-6}$ Pa).

Annealing was performed under the conditions of rising temperature rate of 200° C./hour, holding temperature T3 of 1050° C., holding time of 2 hours, falling temperature rate of 200° C./hour and treatment atmosphere of reduced atmosphere(prepared by passing $N_2$ gas through water vapor under oxygen partial pressure of 0.1 Pa).

D50a (the average particle size of dielectric particles 2a include in internal dielectric layer 2) was found by following procedures. The obtained sintered body was cut and bladed at a plane perpendicular to the stacked direction of internal electrode layers, thermal etching treatment (1200° C., 10 minutes) was performed on the plane, particles of the plane were observed by SEM (scanning electron microscope), converting the particle area to circular area, and then diameter of the circle was made 1.5 times longer to be D50a.

D50b (the average particle size of dielectric particles 20a included in external dielectric layer 20) was found by following procedures. Dielectric particles 20a, included in the external dielectric layer 20 and located 5 μm away from the internal electrode layer 3a, which is arranged outermost part of the internal electrodes 3, to the stacked direction, was measured by the same procedure with the above D50a.

D50c (the average particle size of main component material used to form internal dielectric layer 2) was found by observing particles with SEM and converting particle areas to circular area.

D50a, D50b and D50c were all calculated by the mean value of n=250.

Measurement methods of electric characteristics were as follow. The end faces of the obtained sintered body were bladed by sandblasting, In—Ga alloys were applied, sample electrodes were formed and multilayer ceramic capacitor sample was obtained. The capacitor sample size was 3.2 mm length×1.6 mm width×1.0 mm height, the thickness x of internal dielectric layer 2 was about 1.3 μm, the thickness or internal electrode layer 3 was 0.9 μm. In the same way as mentioned, capacitor samples, wherein the thickness x of internal dielectric layer 2 was about 1.1 μm, were obtained.

TC bias, temperature characteristic and specific dielectric constant ϵ of the obtained capacitor samples were evaluated. However, capacitor samples, wherein thickness x of internal dielectric layer 2 was about 1.3 μm, were only evaluated for their TC bias and specific dielectric constant.

TC bias was evaluated by following. Capacitor samples were evaluated in thermostatic chamber of 85° C. by LCR meter with 120 Hz, 0.5 Vrms, and bias voltage of 2 V/μm. And the capacitance change rate was calculated from measured value at 20° C. and with bias voltage of no impression. As valuation basis, it was considered to be good when the capacitance change rate was more than −23% when the thickness of dielectric layer was 1.3 μm, and more than −25% when the thickness of dielectric layer was 1.1 μm.

As temperature Characteristics(TC), samples were measured in thermostatic chamber of 85° C. by LCR meter at 120 Hz, 0.5 Vrms, 0.5 V/μm, and when more than −7.0%, it was considered to be good.

Specific dielectric constant ϵ was calculated from capacitance measured by digital LCR Meter (4274A made by YHP Co.) at the frequency of 1 kHz, an incoming signal level (measuring voltage) of 1.0Vrms (no unit). As valuation basis, it was considered to be good when the specific dielectric constant ϵ was at least 1800 when the thickness of dielectric was 1.3 μm and at least 1700 when the thickness or dielectric was 1.1 μm, The results are shown in tables 1 and 2.

TABLE 1

| Sample No. | | $BaTiO_3$ included in internal electrode layer paste: lattice constant | discharge amount of hydroxyl group | y1 | y2 | y3 | TC bias | ϵ |
|---|---|---|---|---|---|---|---|---|
| 1 | Ref. Ex. | 3.991 | 10 | 0.65 | 0.2 | 0.814 | −17.1 | 1720 |
| 2 | Ex. | 4.019 | 28 | 0.755 | 0.6 | 0.946 | −17.8 | 1800 |
| 3 | Ex. | 4.011 | 42 | 0.929 | 1.9 | 1.164 | −20.0 | 1903 |
| 4 | Ex. | 4.018 | 68 | 0.943 | 0.9 | 1.182 | −19.2 | 1962 |
| 5 | Ex. | 4.036 | 114 | 1.140 | 2.3 | 1.429 | −21.0 | 1850 |
| 6 | Ex. | 4.046 | 120 | 1.281 | 4.8 | 1.508 | −22.1 | 1920 |
| 7 | Ref. Ex. | 4.064 | 266 | 1.358 | 6.2 | 1.692 | −23.5 | 1750 |

Thickness of Internal Dielectric Layer x = 1.3 μm

As shown in Table 1, when capacitor sample had 1.3 μm thickness of internal dielectric layer, sample 1, wherein y1 is less than 0.7, y2 is less than 0.55, y3 is less than 0.88, was good in TC bias characteristics, however, inferior in ϵ. Sample 7, wherein y1 exceeds 1.3, y2 exceeds 5, y3 exceeds 1.63, was inferior in TC bias and also showed low ϵ. The reason ϵ dropped at sample 7 may be caused by breaking often occurred in internal electrode layers by rapid growth of particles in dielectric layer and increasing amount of coarse particles existing in the dielectric layer. To the contrary, it was observed that the sample 2 to 6 wherein y1 is 0.7 to 1.3, y2 is 0.55 to 5, y3 is 0.88 to 1.63 showed good TC bias characteristics and sufficient a values.

The capacitor samples, wherein y1 only satisfies 0.7 to 1.3, were manufactured by the same method and has been tested, then, the same results were obtained. The capacitor samples, wherein y2 only satisfies 0.55 to 5, were manufactured by the same method and has been tested, then, the same results were obtained. The capacitor samples, wherein y3 only satisfies 0.88 to 1.63, were manufactured by the same method and has been tested, then, the same results were obtained.

TABLE 2

| Sample No. | | $BaTiO_3$ included in internal electrode layer paste: lattice constant | discharge amount of hydroxyl group | y1 | y2 | y3 | TC bias | TC | ϵ |
|---|---|---|---|---|---|---|---|---|---|
| 8 | Ref. Ex. | 3.985 | 10 | 0.81 | 0.9 | 1.02 | −16.2 | −4.8 | 1400 |
| 9 | Ex. | 4.019 | 28 | 1.15 | 2.5 | 1.44 | −20.2 | −5.5 | 1730 |
| 10 | Ex. | 4.024 | 98 | 1.18 | 3.0 | 1.48 | −22.3 | −5.6 | 2063 |
| 11 | Ex. | 4.011 | 42 | 1.21 | 3.2 | 1.51 | −23.3 | −5.7 | 2115 |
| 12-1 | Ex. | 4.029 | 60 | 1.39 | 4.1 | 1.75 | −23.6 | −6.1 | 1950 |
| 12 | Ex. | 4.029 | 110 | 1.39 | 9.8 | 1.75 | −24.1 | −6.6 | 1725 |
| 13 | Ref. Ex. | 4.064 | 266 | 1.47 | 15.3 | 1.85 | −25.8 | −7.2 | 1590 |
| 13-1 | Ex. | 4.001 | 50 | 1.50 | 6.2 | 1.89 | −24.3 | −6.8 | 1850 |
| 13-2 | Ex. | 4.018 | 300 | 1.30 | 12.5 | 1.64 | −24.6 | −6.9 | 1820 |

Thickness of Internal Dielectric Layer x = 1.1 μm

As Shown in Table 2, when capacitor samples had 1.1 μm thickness of the internal dielectric layer, sample 8, wherein y1 is less than 0.85, y2 is less than 1.1, y3 is less than 1.07, was good in TC bias characteristics, however, inferior in ϵ. Sample 13, wherein y1 exceeds 1.45, y2 exceeds 10, y3 exceeds 1.82, were inferior in all TC bias characteristics, temperature characteristics, and ϵ. The reason B dropped at sample 13 may be caused by breaking often occurred in internal electrodes by rapid growth of particles in dielectric layer and increasing amount coarse particles existing in the dielectric layer.

To the contrary, it was observed that the samples 9 to 12 and 12-1, wherein y1 is 0.65 to 1.45, y2 is 1.1 to 10, y3 is 1.07 to 1.82 showed good TC bias characteristics, temperature characteristic and ϵ. When y1 is constant, TC bias characteristics improved as y2 became small.

Compared to table 1, as shown in table 2, it was confirmed that the effect of interior structure of capacitor became remarkable as the thickness of interior dielectric layer became thinner (1.3 μm to 1.1 μm).

The capacitor samples, wherein y1 only satisfies 0.85 to 1.45, were manufactured by the same method and has been tested, then, the same results were obtained. The capacitor samples, wherein y2 only satisfies 1.1 to 10, were manufactured by the same method and has been tested, then, the same results were obtained (sample 13-1). The capacitor samples, wherein y3 only satisfies 1.07 to 1.82, were manufactured by the same method and has been tested, then, the same results were obtained. The capacitor samples, wherein y1 only satisfies 0.95 to 1.45 and y3 only satisfies 1.07 to 1.82, were manufactured by the same method and has been tested, then, the same results were obtained (sample 13-2).

Figure 5:
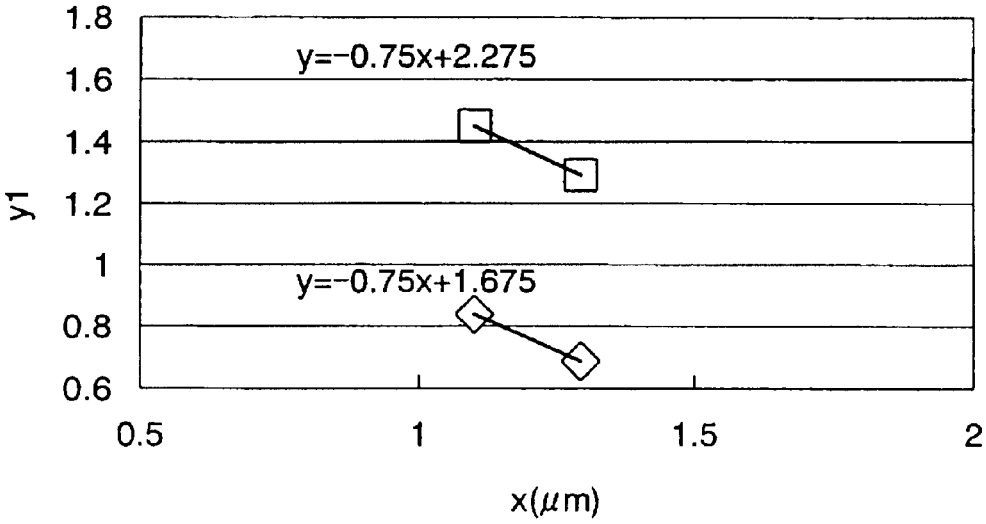
FIG. 5 is a graph showing the relation of x and y1, wherein x is thickness of the internal dielectric layer 2, and y1 is ratio (D50a/D50b) of D50a and D50b where D50a in an average particle size of dielectric particles 2a included in the internal dielectric layers 2 and D50b is an average particle size of dielectric particles 20a included in the external dielectric layer 20 and located at least 5 μm away from an internal electrode layer 3a, arranged outermost part of all the internal electrode layers, to the stacked direction.
Figure 6:
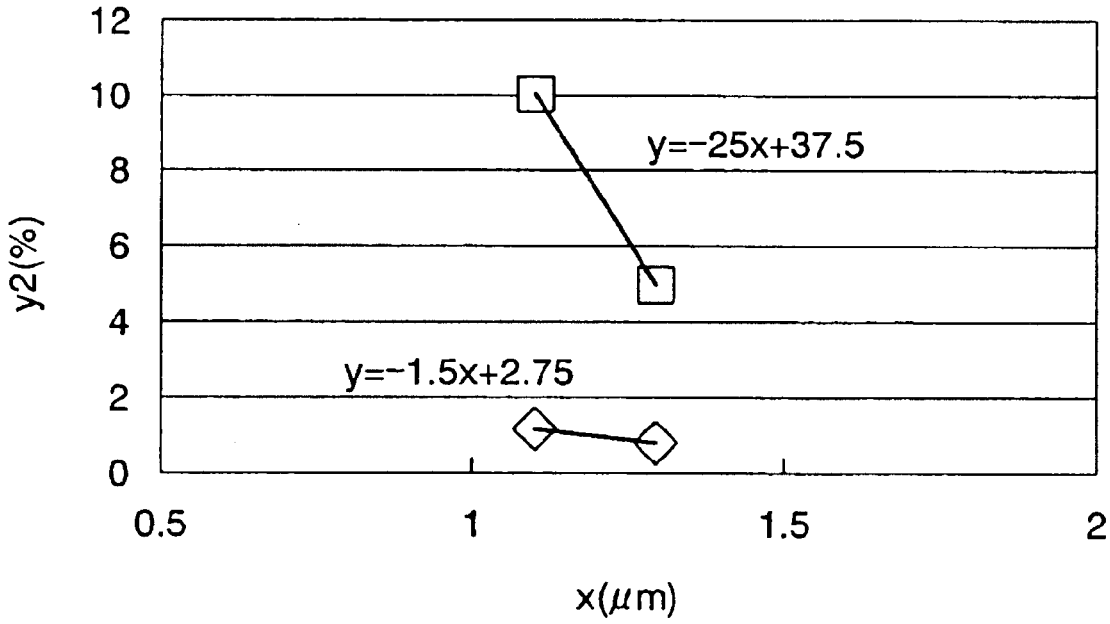
FIG. 6 in a graph showing the relation of x and y2, wherein x is thickness of the internal dielectric layer 2, and y2 is an existing ratio of dielectric particles (coarse particles), having the average particle size of at least 2.25 times larger than D50a, in the dielectric particles 2a, where D50a is the average particle size of dielectric particles 2a included in the internal dielectric layers 2a and FIG. 7 is a graph showing the relation of x and y3, wherein x is thickness of the internal dielectric layers 2, and y3 is a ratio (D50a/D50c) of D50a and D50c where D50a is the average particle size of dielectric particles 2a included in the internal dielectric layers 2 and D50c is the average particle size of $BaTiO_3$ material used to form internal dielectric layers 2.
Figure 7:
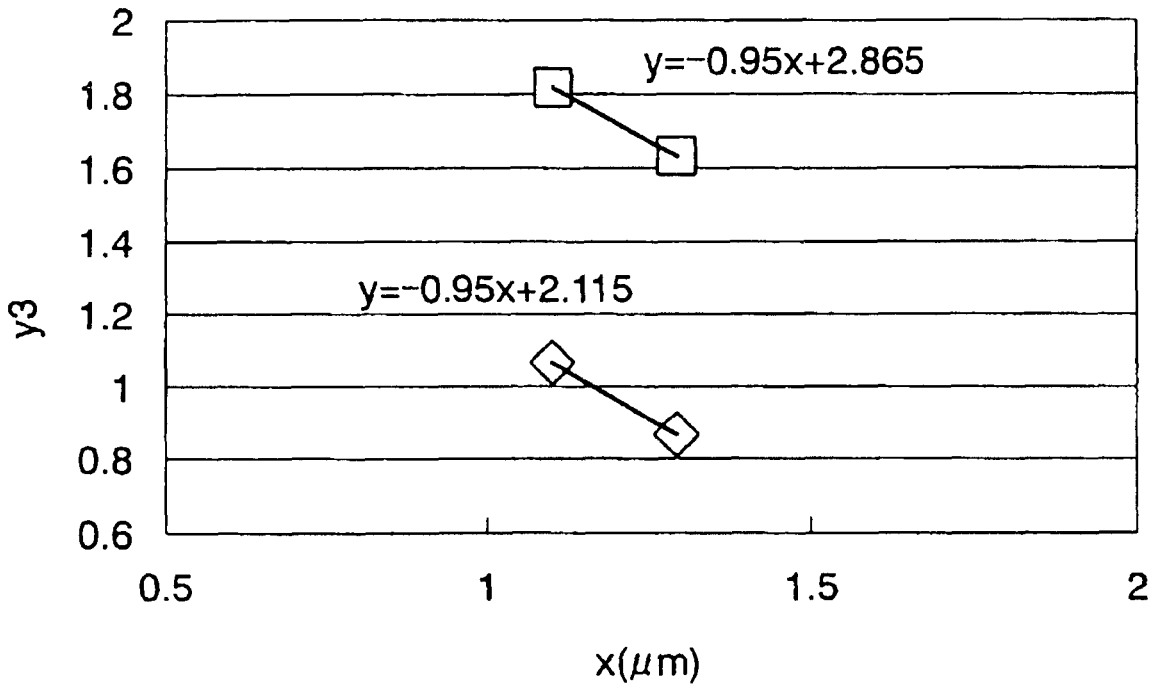

The correlation of x and y1 is shown in FIG. 5, the correlation of x and y2 is shown in FIG. 6, and the correlation of x and y3 is shown in FIG. 7.

Example 2

Capacitor samples were manufactured in the same way as example 1, except the thickness of internal dielectric layer 2 was varied to 1.9 μm, 1.7 μm, 1.5 μm, and 0.9 μm, and evaluated in the same way as example 1, then, the same results were obtained.

Reference Example 1

Capacitor samples were manufactured in the same way as example 1, except the thickness of internal dielectric layer 2 was varied to 0.2 μm and 2.2 μm and evaluated in the same way as example 1.

As a result, when the thickness of internal dielectric layer 2 was at least 2 μm, particle growth in dielectric layer was hardly seen due to the small effect of dielectric material for additives and that an average particle size of dielectric particles in internal dielectric layer 2 was almost constant and was not effected by ceramic particles (dielectric material for additives) in internal electrode layer.

That is claimed is:

1. A multilayer ceramic capacitor having internal electrode layers, internal dielectric layers having thickness of less than 2 μm, and external dielectric layers [wherein,] *wherein:* the internal dielectric layers include a plural number of dielectric particles, and when y2 is ratio of dielectric particles (coarse particles), having an average particle size of at least 2.25 times larger than D50a, existing in dielectric particles where D50a is an average particle size of the dielectric particles included in the internal dielectric layers, and x is thickness *in μm* of the internal dielectric layer, y2 and x satisfy the following [equations;] *equations:* $y2 \leqq -25x+37.5$ and $y2 \geqq -2.75x+4.125$.

2. A multilayer ceramic capacitor having internal electrode layers, internal dielectric layers having thickness of less than 2 μm, and external dielectric layers [wherein,] *wherein:* the internal dielectric layers and the external dielectric layers include a plural number of dielectric particles, and when y1 is ratio(D50a/D50b) of D50a and D50b where D50a is an average particle size of dielectric particles included in the internal dielectric layers and D50b is an average particle size of dielectric particles included in the external dielectric layer and located at least 5 μm away from an internal electrode layer, arranged outermost part of all the internal electrode layers, to the stacked direction, y2 is ratio of dielectric particles (coarse particles),having an average particle size of at least 2.25 times larger than D50a, existing in the dielectric particles included in the internal dielectric layer, and x is thickness *in μm* of the internal dielectric layer, y1 and x satisfy the following [equations;] *equations:* $y1 \leqq -0.75x+2.275$ and $y1 \geqq -0.75x+1.675$ and y2 and x satisfy the following [equations;] *equations:* $y2 \leqq -25x+37.5$ and $y2 \geqq -2.75x+4.125$.

3. A multilayer ceramic capacitor having internal electrode layers, internal dielectric layers having thickness of less than 2 μm, and external dielectric layers [wherein,] *wherein:* the internal dielectric layers and external dielectric layers include a plural number of dielectric particles, and when y3 is ratio (D50a/D50c) of D50a and D50c where D50a is an average particle size of dielectric particles included in the internal dielectric layers and D50c is an average particle size of main component material used to form internal dielectric layers, and x is thickness *in μm* of the internal dielectric layers, y3 and x satisfy the following [equations;] *equations:* $y3 \leqq -0.95x+2.865$ and $y3 \geqq -0.95x+2.115$.

*4. A multilayer ceramic capacitor comprising internal electrode layers, internal dielectric layers having thickness of less than 2 μm, and external dielectric layers, wherein:*

*the internal dielectric layers and the external dielectric layers include a plural number of dielectric particles,*

*and when y1 is ratio (D50a/D50b) of D50a and D50b where D50a is an average particle size of dielectric particles included in the internal dielectric layers and D50b is an average particle size of dielectric particles included in the external dielectric layer and located at least 5 μm away from an internal electrode layer, arranged outermost part of all the internal electrode layers, to the stacked direction,*

*y2 is ratio of dielectric particles (coarse particles) having an average particle size of at least 2.25 times larger than D50a, existing in the dielectric particles included in the internal dielectric layer, and*

*x is thickness in μm of the internal dielectric layers,*

*y1 and x satisfy the following equations:* $y1 \leqq -0.75x+2.275$, $y1>1$ *and* $y1 \geqq -0.75x+1.675$ *and*

*y2 and x also satisfy a relationship.*

* * * * *